Patented Aug. 31, 1948

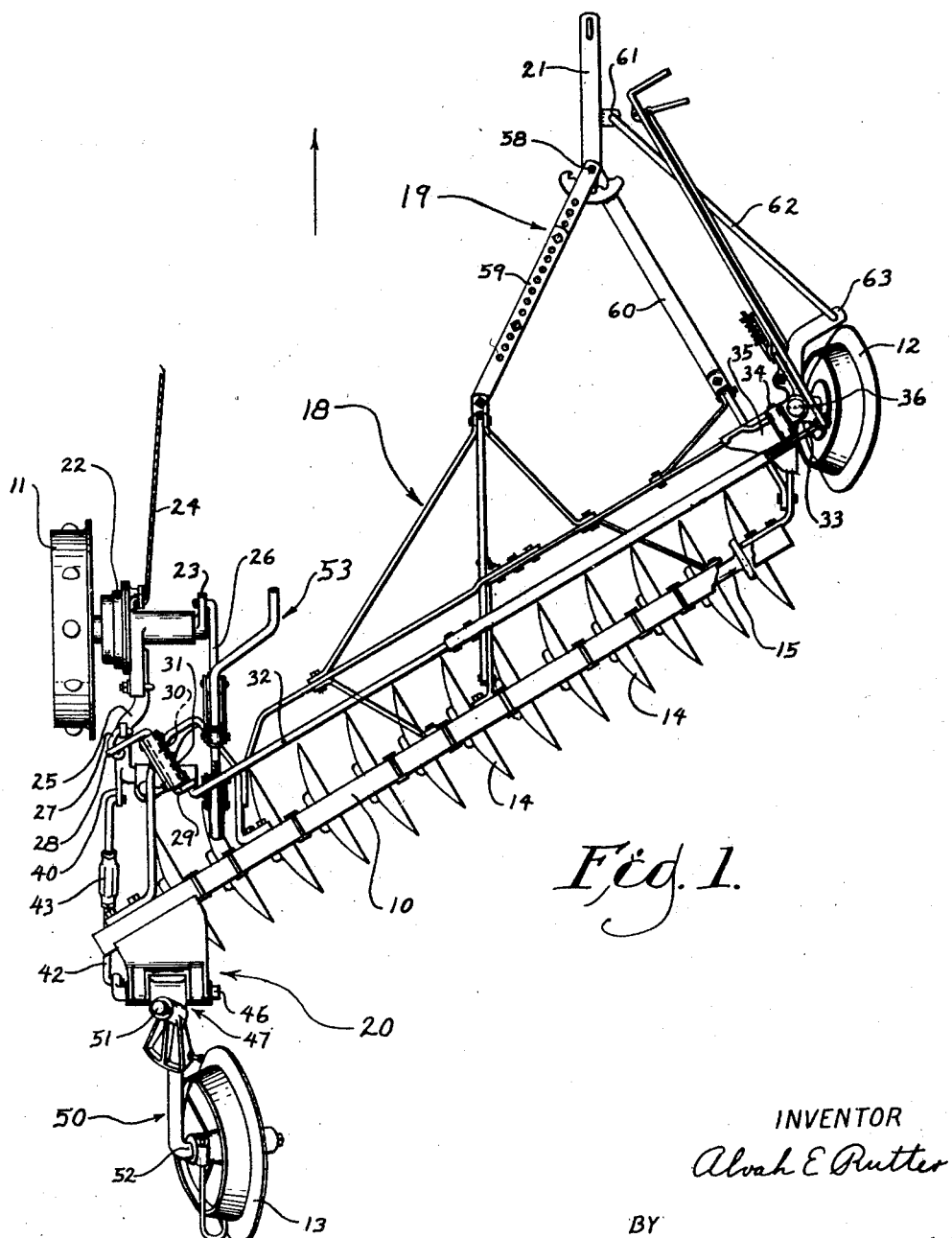

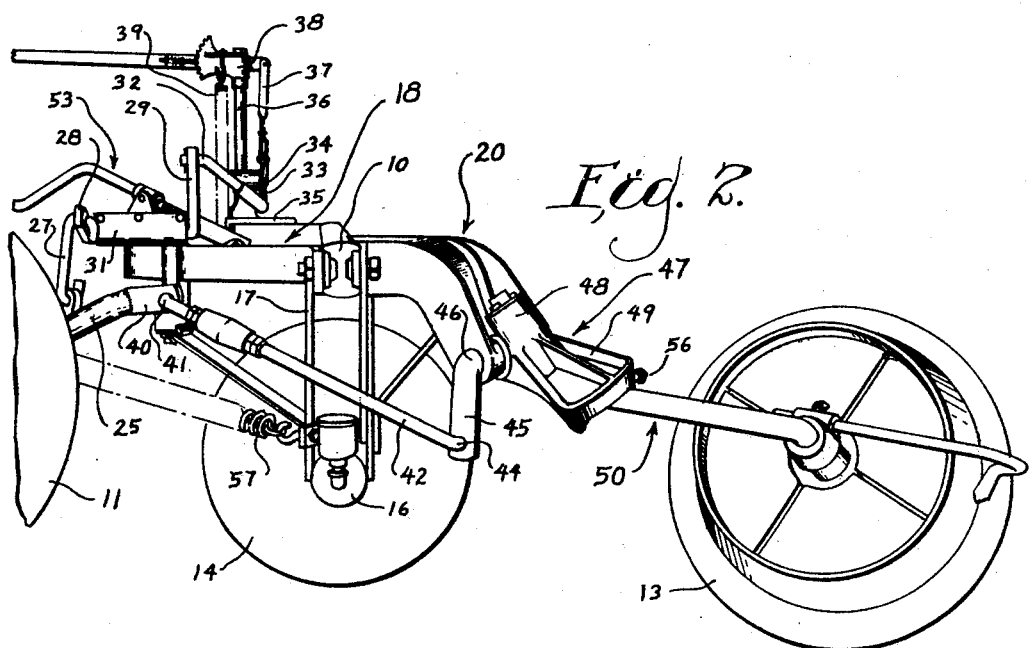
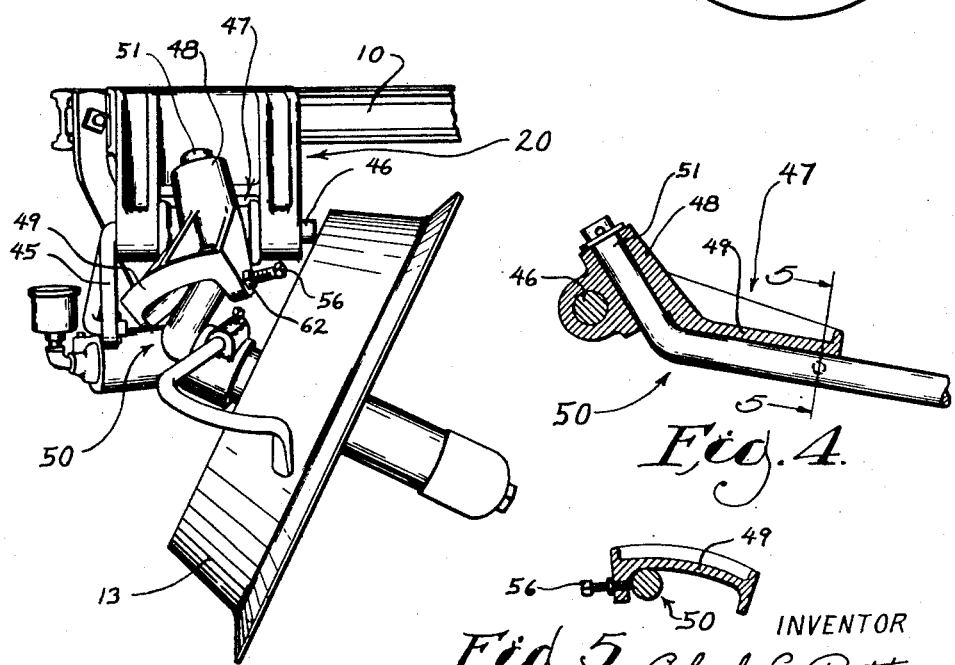

2,448,469

UNITED STATES PATENT OFFICE 2,448,469

DISK PLOW AND CASTER WHEEL

Alvah E. Rutter, Rockford, Ill., assignor to J. I. Case Company, Racine, Wis., a corporation of Wisconsin Application January 25, 1945, Serial No. 574,586

3 Claims. (Cl. 97—53)

1

This invention relates to disk plows and an object thereof is to generally improve the construction and operation of devices of this class.

A further object is to improve the construction and operation of the power lift mechanism. More particularly an object of the invention is to provide for improved stability of the plow when being transported in raised position, more particularly as regards undesired swinging of the tail wheel.

Another object is to provide the expedients necessary for the realization of the above objects.

Further objects will become apparent from the following description and accompanying drawings in which a satisfactory embodiment of the invention is shown. However, it is to be understood that the invention is not limited to the details disclosed, but includes all such variations and modifications as fall within the spirit of the invention as herein expressed.

In the drawings,

Figure 1 is a plan view of a disk plow embodying the invention.

Fig. 2 is a partial left side elevation of the same taken from slightly to the rear.

Fig. 3 is a rear elevation somewhat enlarged with parts broken away and others removed.

Fig. 4 is an enlarged detail of certain mechanism indicated in Fig. 2 with parts broken away.

Fig. 5 is a sectional view on the line 5—5 of Fig. 4.

As seen in Fig. 1, the plow comprises a beam 10, supported by a land wheel 11, a front furrow or supporting wheel 12 and a rear furrow wheel 13, beam 10 being supported so as to extend in a direction oblique to the path of travel of the implement in a manner common to plows of this type. Beam 10 supports a plurality of disks 14—14 in the present instance fixed relatively to the spindle 15, suitable bearings as 16 being spaced below beam 10 by brackets as 17 and rotatively supporting spindle 15. A forwardly projecting framework generally designated as 18 connects with wheels 11 and 12 to support beam 10 therefrom. Frame 18 also connects with a drawbar structure generally designated as 19 which acts to propel the implement in a manner similar to that described in applicant's co-pending application, Serial 504,427, filed September 30, 1943. Wheel 13 is connected with beam 10 through a frame or bracket generally designated as 20.

The implement is drawn by a tractor or the like, not shown, connected with a portion 21 of

2 drawbar structure 19 traveling in the direction indicated, wheel 11 running on the unplowed ground, wheel 12 running in the last previously formed furrow and wheel 13 running in the last furrow being formed at the moment. Disks 14 are therefore advanced in well-known manner in a position to slice the ground as is common in disk plows of this type, a considerable reaction toward the left, as seen in Fig. 1, being developed. This reaction is withstood by wheels 12 and 13 running against their respective furrow walls in well-known manner.

Such implements are heavy and expedients are commonly provided for raising them by power so that disks 14 will clear the ground when it is desired to transport the implement from place to place. For this purpose, in the present instance, wheel 11 is mounted on a cyclic clutch of well-known type 22, having a crank arm 23 which describes a half-turn and comes to rest in the event of a pull on a trip rope 24. This motion raises or lowers beam 10 and frames 18 and 20 relatively to wheels 11, 12 and 13 through mechanism similar to that disclosed in the above identified pending application.

Sufficient to say, actuation by clutch 22 of crank arm 23 causes a swinging of an axle 25 through a link 26 to a normally fixed point on frame 18 in manner generally well-known with consequent raising or lowering of frame 18 and beam 10. Swinging of axle 25 causes up-and-down movement of a link 27 which causes swinging of an arm 28. Swinging of arm 28 actuates an upstanding arm 29 through a journal portion 30 carried in a bearing 31 fixed on a portion of frame 18.

Arm 29 actuates a pull rod 32 which extends generally lengthwise of beam 10 which rocks a lever 33 pivoted at 34 to a fitting 35 fixed with frame 18. Fitting 35 acts as a guide for a sliding axle portion 36 connected in well-known manner to wheel 12. A link 37 connects axle 36 with an adjusting lever portion 38 which provides for depth adjustment in well-known manner, a counterbalancing spring 39 being connected between adjusting portion 38 and a portion of frame 18 to reduce the load on the actuating mechanism. Thus swinging of axle 25 will act to cause sliding movement of axle 36, the result being to raise and lower fulcrum point 34 and consequently frame 18 relatively to wheel 12.

Connections are provided to rear furrow wheel 13 for changing its position in accordance with shifting of axle 25. The latter has an arm 40 extending generally in a direction opposite to crank arm 25 as best shown in Fig. 2, and pivotally connected at 41 to a pull rod 42, a turnbuckle or other suitable length adjusting means 43 preferably being interposed. Rod 42 is pivoted at 44 to an arm 45 on a rock shaft 46 carried in above-mentioned bracket 20. Rock shaft 46 is fixed with a casting or fish tail unit generally designated as 47, or the like, having a bearing portion 48 and a fishtail portion 49. A crank axle generally designated as 50 has a journal portion 51 extending in a generally vertical direction in bearing 48 for lateral swinging movement of axle 50 and a spindle portion 52 on which is journaled above mentioned wheel 13. Counterclockwise movement of axle 25, as seen in Fig. 2, (corresponding to raising movement of the plow) therefore causes a pull on rod 42 and clockwise rotation of rock shaft 46. This depresses casting 47 and accordingly axle 50 and wheel 13. The movement of wheel 13, as will be apparent, has been made less than the movement of wheel 11 since as is well-known, wheel 13 normally travels in the bottom of the furrow and does not need to shift relatively to beam 10 to as great an extent as land wheel 11.

A crank and screw mechanism generally designated as 53 may be actuated to change the effective length or point of connection of link 26 to change the depth of plowing. It will be noted that with land wheel 11 in its raised or plowing position, arm 40 and rod 42 are substantially in dead center relation so that small movements of axle 25 for adjusting the plowing depth have virtually no effect on the action of axle 50 and furrow wheel 13. Since furrow wheel 13 should remain substantially at the level of the lowest point of disks 14, no movement of axle 50 is necessary when adjusting the plowing depth. Turnbuckle 43 may be used to arrive at the proper position of axle 50 in the first instance.

Axle 50 may swing laterally in casting 47 in well-known manner but is limited in its movement to the right as seen in Figs. 1 and 3 by a set screw 56 engaged in fishtail portion 49 and which may be adjusted to position wheel 13 to take its proper share of the landward pressure.

As will now be apparent, when it is desired to transport the implement from place to place, wheels 11, 12 and 13 are lowered, or more properly, frame 18 and bracket 20 are raised relatively to wheels 11, 12 and 13 by the action of power lift clutch 22, the implement then riding on the wheels with disks 14 clear of the ground. Under these conditions, in the past, there has been a tendency for machines of this type to swing toward the right partly because of the unsymmetrical disposition of the weight and friction drag relatively to draw bar portion 21. Due to the free swinging characteristic of axle 50, this swinging tendency has not been effectively resisted and the implement would not trail steadily. In the present instance, an impositive force is provided tending to hold axle 50 yieldably in contact with set screw 56. For this purpose fishtail portion 49 is inclined downwardly toward the left side of the implement as clearly indicated in Fig. 3 so that as axle 50 swings to the left, it will necessarily raise casting 47 and bracket 20 a slight amount. Conversely, the weight imposed on bracket 20 will have a tendency to swing axle 50 to the right into contact with set screw 56.

The amount of inclination of portion 49 is such that this tendency is easily overcome upon a left turn of the implement so that wheel 13 will not be dragged sidewise. However, in ordinary transporting of the implement, axle 50 will be substantially continuously maintained in contact with set screw 56.

Furthermore, the fishtail portion 49 is curved on its undersurface as particularly seen in Fig. 5. Thus as axle 50 swings to the left, (right as seen in Fig. 5) the resistance to swinging, above explained, increases because of the increasing lifting effect as the axle proceeds into the steeper slope of the curved surface.

The beneficial action is also apparent when the power lift is actuated at which times the drag on landwheel 11 tends to cause the left side of the implement to lag or drop back with a swinging of axle 50 to the left, as seen in Fig. 1. The yielding pressure tending to prevent swinging of axle 50 to the left also tends to resist swinging of the implement to the right and consequently prevents or minimizes swinging of the implement upon actuation of the power lift.

A counterbalancing spring 57 is tensioned between above mentioned bearing 16 and crank axle 25 to assist in the lifting movement of clutch 22. By virtue of this spring and spring 39, the stresses in the parts are substantially reduced. Drawbar portion 21 is pivoted at 58 to links 59 and 60 which are engaged at suitable points with frame 18. Portion 21 may swing relatively to links 59 and 60 when the plow is turned and an ear 61 is pivotally connected by a link 62 to an arm 63 fixed with above mentioned axle 36. Swinging of member 21 will therefore cause swinging or steering movement of axle 36 and accordingly of front furrow or supporting wheel 12.

Preferably, fishtail casting 47 is so formed that bearing portion 48 is inclined somewhat to the left as seen in Fig. 3, this inclination tending to assist in the action of the weight of the implement in urging axle 50 and wheel 13 to the right. In order to maintain the adjustment of set screw 56, a lock nut 62 is provided.

The operation of the invention is thought to be clear from the above description, the implement being raised and lowered in the manner similar to that described in applicant's co-pending application. The tendency toward swinging or unsteady running of the implement being yieldably resisted by the action of axle 50, as heretofore described.

The above being a complete description of an illustrative embodiment of the invention, what is claimed as new and desired to be secured by Letters Patent of the United States is:

1. In a disk plow of the type having a plurality of disks disposed axially oblique to the direction of travel so as to result in a landward thrust, said plow having a power lift and a rear furrow wheel, a laterally swingable axle for the furrow wheel, a connection to said axle including a substantially horizontal pivot, a fishtail member carried by said substantially horizontal pivot and a pivotal connection between said axle and said fishtail member providing free lateral swinging movement of said axle at all times, said pivotal connection being upwardly directed and inclined upwardly and toward the landside of said plow for biasing said swinging movement in one direction, said fishtail member including a downwardly directed guiding surface concentric with said pivotal connection and engaging said axle for guiding it in its lateral swinging, spaced stop portions on said fishtail member for limiting the swinging of said axle, and a connection from said power lift for rocking said fishtail member about said substantially horizontal pivot.

2. In a disk plow of the type having a plurality of disks disposed axially oblique to the direction of travel so as to result in a landward thrust, said plow having a power lift and a rear furrow wheel, a laterally swingable crank axle for said rear furrow wheel, a connection to said plow for said axle including a substantially horizontal pivot, a fishtail casting carried by said horizontal pivot, a journal bearing for said crank axle in said fishtail casting, said bearing being upwardly directed and inclined upwardly and toward the landside of said plow for biasing said axle in one direction, said fishtail casting including a downwardly directed guiding surface concentric with said bearing and engaging said axle for guiding it in its lateral swinging, stop means for limiting the swinging of said axle in the direction in which it is biased by the inclination of said journal bearing, and said stop means being adjustable for varying the position of said axle at the extremity of its lateral swinging movement in the biased direction.

3. In a disk plow of the type having a plurality of disks disposed axially oblique to the direction of travel so as to result in a landward thrust, said plow having a power lift and a rear furrow wheel, a laterally swingable crank axle for said rear furrow wheel, a connection to said plow for said axle including a substantially horizontal pivot, a fishtail casting carried by said horizontal pivot, a journal bearing for said crank axle in said fishtail casting, said bearing being upwardly directed and inclined upwardly and toward the landside of said plow for biasing said axle in one direction, said fishtail casting including a downwardly directed guiding surface concentric with said bearing and engaging said axle for guiding it in its lateral swinging, spaced stop portions on said fishtail casting for limiting the swinging of said axle, the stop portion disposed in the direction in which said axle is biased by the inclination of said journal bearing being adjustable for varying the position of said axle at the extremity of its lateral swinging movement in the biased direction.

ALVAH E. RUTTER.

REFERENCES CITED

The following references are of record in the file of this patent:

UNITED STATES PATENTS

| Number | Name | Date |
| --- | --- | --- |
| 629,732 | Waterman | July 25, 1899 |
| 1,308,169 | Crane | July 1, 1919 |
| 1,865,598 | Verity | July 5, 1932 |
| 1,885,955 | Silver | Nov. 1, 1932 |
| 2,256,816 | Scarlett | Sept. 23, 1941 |

FOREIGN PATENTS

| Number | Country | Date |
| --- | --- | --- |
| 111,496 | Australia | Sept. 29, 1939 |